(12) United States Patent
Shin et al.

(10) Patent No.: US 9,106,902 B2
(45) Date of Patent: Aug. 11, 2015

(54) DEPTH INFORMATION DETECTION APPARATUS AND APPARATUS FOR OBTAINING 3-DIMENSIONAL CONTENT USING THE SAME

(75) Inventors: Yunsup Shin, Seoul (KR); Yungwoo Jung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 641 days.

(21) Appl. No.: 13/423,684

(22) Filed: Mar. 19, 2012

(65) Prior Publication Data

US 2012/0242829 A1    Sep. 27, 2012

Related U.S. Application Data

(60) Provisional application No. 61/475,231, filed on Apr. 14, 2011.

(30) Foreign Application Priority Data

Mar. 25, 2011    (KR) .......................... 10-2011-0026887

(51) Int. Cl.
*H04N 7/18*    (2006.01)
*H04N 13/02*    (2006.01)
*G01B 11/02*    (2006.01)

(52) U.S. Cl.
CPC .......... *H04N 13/0271* (2013.01); *G01B 11/026* (2013.01); *H04N 13/0207* (2013.01)

(58) Field of Classification Search
USPC .......................................................... 348/135
See application file for complete search history.

(56) References Cited

U.S. PATENT DOCUMENTS

| 8,462,586 | B2* | 6/2013 | Schenk et al. | ................. 367/118 |
| 8,558,873 | B2* | 10/2013 | McEldowney | ................... 348/46 |
| 2003/0223248 | A1* | 12/2003 | Cronin et al. | .................. 362/555 |
| 2007/0103687 | A1* | 5/2007 | Okazaki | ........................ 356/417 |

* cited by examiner

*Primary Examiner* — Dave Czekaj
*Assistant Examiner* — Leron Beck
(74) *Attorney, Agent, or Firm* — Birch, Stewart, Kolasch & Birch LLP

(57) ABSTRACT

An apparatus for obtaining 3D content is provided. The apparatus comprises: a lighting unit for outputting a lighting pattern having coordinate information; a depth sensor for receiving a returning beam output from the lighting unit and reflected from an object; a 2D image capturing unit for obtaining a second-dimensional image; a data processor for calculating the depth of each region using the distribution of characteristics represented on an image obtained by the depth sensor, and processing the 2D image data obtained by the 2D image capturing unit and the calculated depth data and encoding the same according to a predetermined format; and a controller for controlling the lighting unit, the 2D image capturing unit, and the data processor. The lighting unit comprises a light source and an optical element comprising a plurality of sub-grid regions for modulating beams coming from the light source.

15 Claims, 9 Drawing Sheets

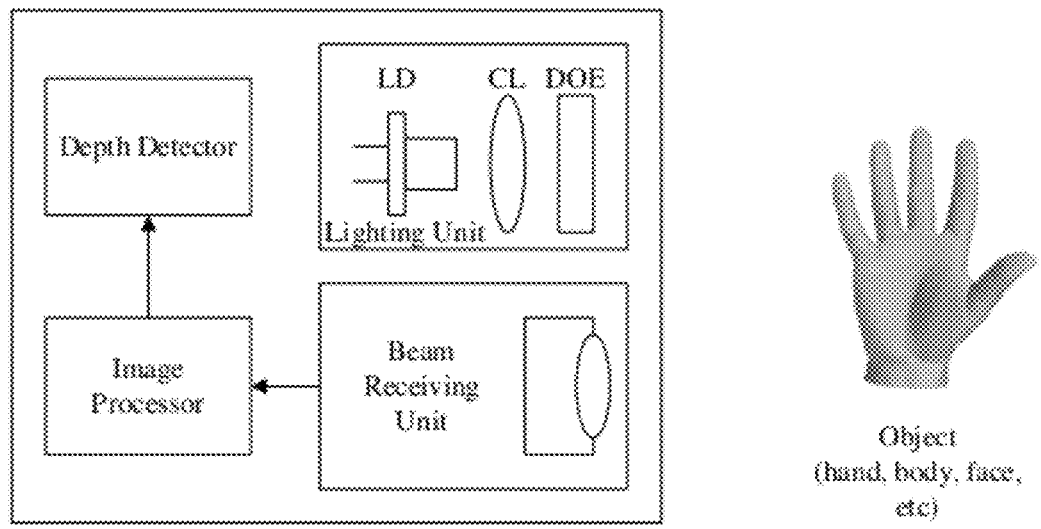

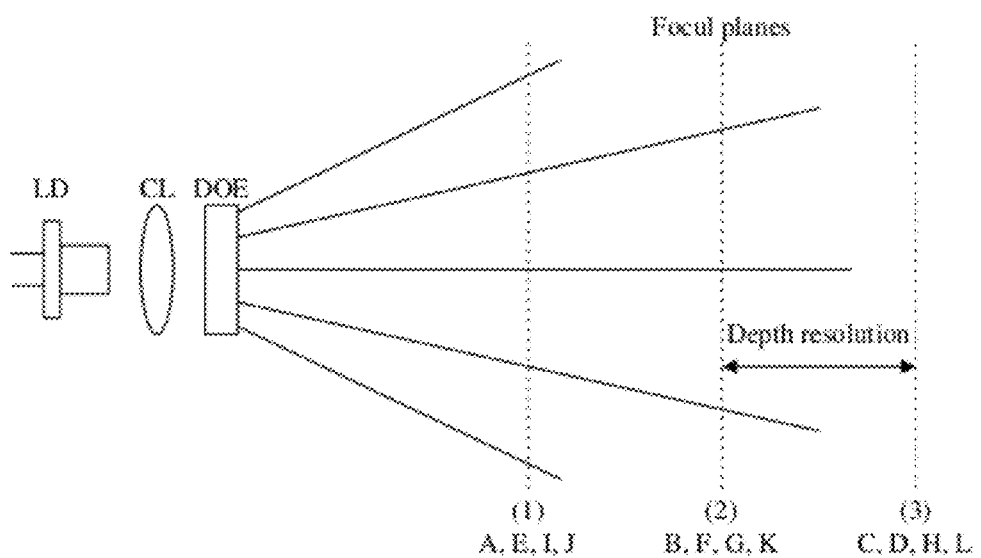

DEPTH INFORMATION DETECTION APPARATUS AND APPARATUS FOR OBTAINING 3-DIMENSIONAL CONTENT USING THE SAME

This application claims the benefits of Korea Patent Application No. 10-2011-0026887 filed on Mar. 25, 2011, and U.S. Provisional Application No. 61/475,231 filed on Apr. 14, 2011, which are hereby incorporated by reference.

BACKGROUND

1. Field

This document relates to an apparatus for obtaining 3D content, and more particularly, to an apparatus which effectively obtains a 3D image by combining a depth information detection solution and a general 2D image, the solution consisting of pattern lighting using a light beam and a beam receiving sensor.

2. Related Art

Studies on user interfaces that accurately reflect users' intentions by simple and natural user motions are actively underway. Taking a simple example, a keyboard or mouse may be a tool for a user interface, and products using screen touch have been attracting attention recently.

Regarding virtual reality, research on motion recognition technologies as means for user interfaces is continuously ongoing. There have been developed methods such as the recognition of a user's spatial motion via a motion controller having an accelerometer, the recognition of a user's motion by analyzing an image obtained through two or more cameras (image sensors), and the recognition of a user's motion by combining a motion controller and a camera image.

As a rule, the use of a single image sensor enables second-dimensional image analysis. Thus, in order to obtain distance or depth information, two or more image sensors should be used. Otherwise, if a single image sensor is used, a user making a motion has to hold a motion controller. In the latter case, too, three-dimensional analysis of only the location of the motion controller is possible.

With the development of 3D display technology, techniques associated with imaging devices for obtaining 3D content are getting a lot of attentions recently. A currently widely used 3D image capture and display method is, as shown in FIG. 1, to simultaneously capture images with two or more identical cameras (each consisting of a lens and a sensor) at different visual angles, compare the images to obtain a general 2D image and depth information based on the visual angle difference, and reconfigure it into two images for a left-eye and a right-eye and display them on a 3D display device.

In the above-mentioned method, a plurality of 2D images with a fixed visual angle difference are used to create depth information by calculation. This may cause many errors, and require two or more cameras, each consisting of an expensive lens and a sensor, especially, for a high-resolution image, thereby placing imaging equipment in a high price range. As long as depth information can be directly obtained, many problems occurring in obtaining 3D content can be solved.

SUMMARY

The present invention has been made in an effort to solve the above-mentioned problems, and an aspect of this document is to provide an apparatus for detecting depth-direction information of an object by a single image sensor alone by projecting light having a special function onto the object.

Another aspect of this document is to provide an optical element and apparatus which are able to detect depth-direction information of an object by a single image sensor alone.

Another aspect of this document is to provide a system which captures 3D content by combining a 2D image capturing device and a depth detection apparatus.

To achieve the above aspects, there is provided an apparatus for recognizing the distance of an object according to an embodiment of the present invention, the apparatus comprising: a lighting unit comprising one or more light sources and one or more diffractive elements, and for outputting a beam having at least two different focal positions; a beam receiving unit comprising an image sensor, and for receiving a returning beam reflected or scattered from the object; and an image processor for detecting the distance to the object from an image obtained by the beam receiving unit upon receiving the beam output by the lighting unit and reflected or scattered from the object.

In an embodiment, the output beam of the light source may be a laser having a wavelength longer than that of visible light.

In an embodiment, the lighting unit may further comprise a lens for adjusting the degree of convergence/divergence of the output beam of the light source.

In an embodiment, the beam receiving unit may further comprise a filter for selecting the wavelength of the output beam of the light source and a lens for focusing the beam on the image sensor.

In an embodiment, the diffractive element may comprise two or more segmented regions, at least one of the segmented regions may have a different focal position from those of the other segmented regions, and a pattern formed by the at least one segmented region may have different characteristics from those of a pattern formed by the other segmented regions.

In one embodiment, when the diffractive element comprises two or more segmented regions, and two or more segmented regions are defined as a group, at least one group may have a different focal position from those of the other groups, and a pattern formed by the at least one group may have different characteristics from those of patterns formed by the other groups.

In an embodiment, the number of segmented regions or number of groups included in the diffractive element may be equal to the number of focal positions.

In an embodiment, the lighting unit may comprise a single light source and a single diffractive element, or may comprise a single diffractive element and the same number of light sources as focal positions.

In an embodiment, if the lighting unit comprises a plurality of light sources, the lighting unit may comprise a prism for changing the path of light to cause beams coming from the plurality of light sources to pass through the diffractive element.

In an embodiment, each of the light sources of the lighting unit may output a beam of a different wavelength from those of the other light sources. Alternatively, each light source of the lighting unit may further comprise a lens for adjusting the degree of convergence/divergence of the output beam of the light source, each light source outputting beams of the same wavelength, and the distance between the light source and the corresponding lens may vary from light source to light source.

In an embodiment, the lighting unit may comprise the same number of light source and diffractive element pairs as the focal positions, each of the light source and diffractive element pairs may have a different focal position from those of the other light source and diffractive element pairs, and a pattern formed by each light source and diffractive element pair may have different characteristics from that of patterns formed by the other light source and diffractive element pairs.

In an embodiment, each light source of the lighting unit may output beams of a different wavelength from those of the other light sources. Alternatively, each light source of the lighting unit may further comprise a lens for adjusting the degree of convergence/divergence of the output beam of the light source, each light source outputting beams of the same wavelength, and the distance between the light source and the corresponding lens may vary from light source to light source.

In an embodiment, the characteristics may be one or two or more combinations of a size, a shape, a direction, a strength, a density, a period, and a polarization of a pattern.

In an embodiment, if the polarization of the pattern differs according to a focal position, the beam receiving unit may further comprise a polarization element that is rotatable and disposed in front of the image sensor to distinguish between polarizations.

There is provided a depth information detection apparatus according to an embodiment of the present invention, the apparatus comprising: a lighting unit comprising a light source and an optical element consisting of a plurality of sub-grid regions for modulating beams coming from the light source, and for outputting a lighting pattern having coordinate information; a beam receiving unit comprising a sensor, and for receiving returning beams output from the lighting unit and reflected from an object, wherein a beam having passed through at least one sub-grid region shows different a value or a level of characteristics from those of beams having passed through the other sub-grid regions; and a depth calculator for calculating the depth for each coordinate by using the distribution of predetermined characteristics represented on an image obtained by the sensor.

In an embodiment, the characteristics may be one or two or more combinations of a size, a shape, a direction, a strength, a density, a period, and a polarization of the beam.

In an embodiment, planar arrays of sub-grid regions, each planar array consisting of a plurality of sub-grid regions, may be arranged in the optical element such that at least adjacent sub-grid regions do not overlap with each other and sub-grid regions showing different values or levels of the above characteristics are uniformly distributed.

In an embodiment, the depth calculator may determine a sub-grid region in the optical element corresponding to a region in the image based on the distribution of the predetermined characteristics, and may obtain depth information of the region by using the difference between the original coordinates of the region in which a beam having passed through the determined sub-grid region is reflected from a relatively distant position and imaged on the sensor and the coordinates of the region corresponding to the determined sub-grid region.

In an embodiment, the apparatus may comprise two or more N lighting units placed at different distances from the beam receiving unit, or the lighting unit may be mechanically movable.

In an embodiment, the apparatus may further comprise a lighting controller for selecting one or more of the N lighting units and operating the same, or adjusting the distance between the movable lighting unit and the beam receiving unit.

In an embodiment, if the N lighting units output the same type of lighting pattern, the lighting controller may select only one lighting and operate the same, or if at least one of the N lighting units outputs a different type of a lighting pattern, the lighting controller may select two or more lightings and operate the same.

There is provided an apparatus for obtaining 3D content according to yet another embodiment of the present invention, the apparatus comprising: a lighting unit for outputting a lighting pattern having coordinate information; a depth sensor for receiving a returning beam output from the lighting unit and reflected from an object; a 2D image capturing unit for obtaining a second-dimensional image; a data processor for calculating the depth of each region using the distribution of characteristics represented on an image obtained by the depth sensor, and processing the 2D image data obtained by the 2D image capturing unit and the calculated depth data and encoding the same according to a predetermined format; and a controller for controlling the lighting unit, the 2D image capturing unit, and the data processor.

Therefore, it is possible to detect depth information and recognize a user motion in a three-dimensional manner by a simple configuration. Also, 3D image content can be efficiently generated.

BRIEF DESCRIPTION OF THE DRAWINGS

The accompany drawings, which are included to provide a further understanding of the invention and are incorporated on and constitute a part of this specification illustrate embodiments of the invention and together with the description serve to explain the principles of the invention.

FIG. 2 illustrates the configuration of an apparatus for obtaining distance information of an object according to an embodiment of the present invention;

FIG. 3 illustrates the configuration of a DOE segmented into a plurality of segmented regions (N×M) having different structures;

FIG. 4 shows an embodiment in which a plurality of focal planes are formed by a lighting unit comprising a DOE segmented into a plurality of regions;

FIG. 5 shows an embodiment of various characteristics for distinguishing between patterns having different focal positions;

DETAILED DESCRIPTION

Figure 1:
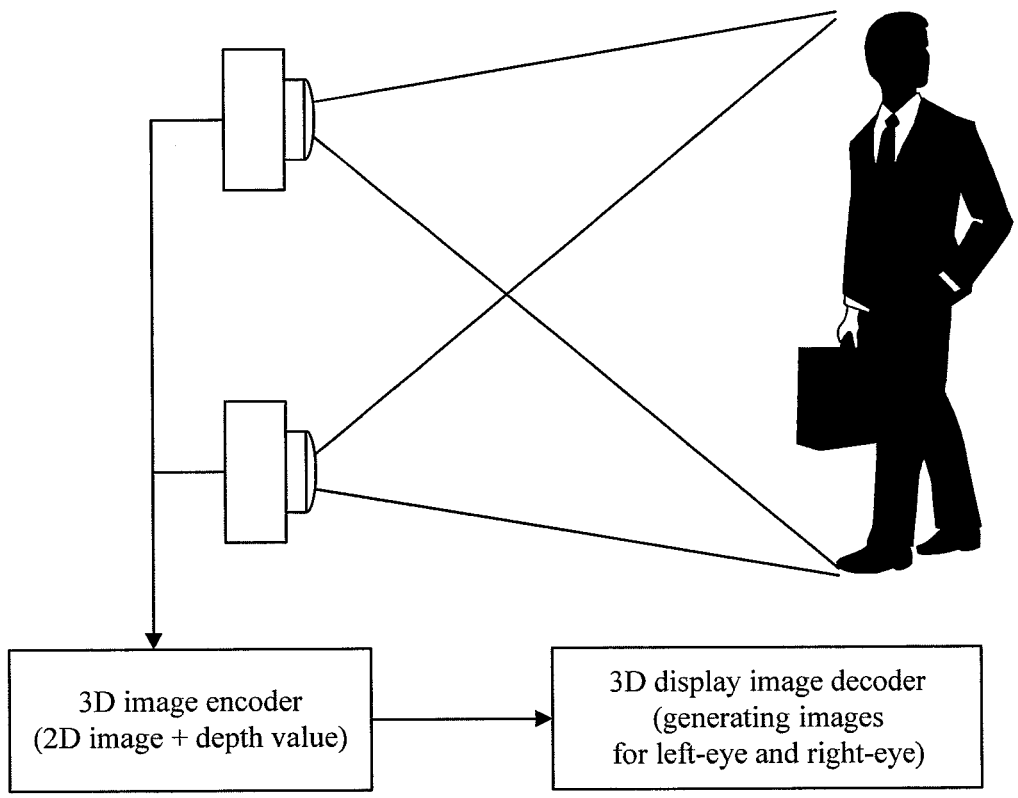
FIG. 1 illustrates a conventional method for obtaining 3D content using two or more cameras of the same type.

Hereinafter, an exemplary embodiment of the present invention will be described in detail with reference to the accompanying drawings.

In recent years, the technology of recognizing a user's motion by using light has been attracting a lot of attentions. Particularly, there is an ongoing study on an apparatus that easily improves an image processing algorithm and renders it applicable irrespective of surrounding light conditions such as daytime/nighttime by applying active lighting beam projection to a conventional method of tracking an object by processing images obtained through an image sensor, and this apparatus is actually used. Such an apparatus is superior in the reliability and stability of motion recognition, as compared to the prior art.

As a rule, the use of a single image sensor enables two-dimensional image analysis, whereas projection of light with a special function enables three-dimensional image analysis because depth-direction information can be detected. Thus, the application range and reliability can be innovatively expanded and enhanced.

The configuration of the apparatus of the present invention which obtains distance information of an object and recognizes a user's motion by using a lighting unit for emitting light having a special function and a beam receiving unit for detecting a beam reflected from a recognition object is shown in FIG. 2.

The recognition object may be a person's hand, face, body, etc.

The apparatus for recognizing the distance of an object according to the present invention may comprise a lighting unit, a beam receiving unit, an image processor, and a depth detector.

The lighting unit may comprise a light source (e.g., a laser diode (LD) having a predetermined wavelength) for emitting light having a predetermined wavelength so as to emit light having a special function, a lens (e.g., a collimate lens (CL)) for adjusting the degree of convergence/divergence of light from the light source, and a diffractive optical element (DOE) for modulating (e.g., diffracting) the light whose degree of convergence/divergence is adjusted and adding a special function to the light.

The beam receiving unit may comprise an image sensor such as a CCD, a CMOS, and so on. The beam receiving unit may further comprise a filter for selecting wavelength, polarization, etc. or a lens for focusing a reflected beam on the image sensor.

The light source may be a laser having a longer wavelength than visible light, which can use infrared light outside the visible light range so as to distinguish between the infrared light and a beam reflected from an object by natural light and imaged on the image sensor and keep a person from recognizing lighting, has a limited wavelength range to improve the diffraction properties and detection sensitivity, and shows excellent temporal and spatial characteristics of light.

The optical element, e.g., diffractive optical element DOE, may have a different focal depth according to design. Computer-generated hologram (CGH) design enables spatial division by segmenting the regions of the diffractive optical element, and makes it possible to design and manufacture different structures in the respective regions.

For example, as shown in FIG. 3, the DOE may be designed such that the DOE is segmented into M×N regions, the respective regions have different structures, for example, diffraction grid structures, or the regions are divided into groups and the respective groups have different structures. This makes the radiation pattern of each region or each group have a different shape or different characteristics, and makes each region or each group have a different convergence property so that they have different reference focal planes.

The image processor processes a beam entering through the beam receiving unit. It is able to process an image formed by reflection from the object by natural light and detect a second-dimensional motion of the object. Especially, it is able to distinguish a beam reflected from the object by the light from the light source and DOE of the lighting unit from a beam reflected from the object by the natural light and process it. The depth detector calculates the depth of the object based on the image processed by the image processor.

The image processor and the depth detector can recognize a three-dimensional motion of the object by combining an image formed by natural light and separately processed by the image processor with an image formed by a beam from the lighting unit. The depth detector may be configured separately from the image processor, or the functionality of the depth detector may be implemented in the image processor.

FIG. 4 shows an embodiment in which a plurality of focal planes are formed by a lighting unit comprising a DOE segmented into a plurality of regions.

In an example for even distribution of light amount, the DOE may be designed and manufactured such that the A, E, I, and J regions among the segmented regions of the DOE have the same structure and the pattern formed by these regions have a reference focal plane at position (1), the pattern formed by the B, F, G, and K regions have a reference focal plane at position (2) in the same manner as above, and the pattern formed by the C, D, H, and L regions have a reference focal plane at position (3).

Each pattern may have a focal depth zone with its focus at a predetermined depth of +/− with respect to its reference focal plane. If an object to be tracked is located in the focal depth zone, a pattern reflected and scattered from the object is focused on the image sensor and takes a clear shape. On the other hand, a pattern out of the focal depth zone is reflected and scattered from the object and becomes out of focus when reaching the image sensor, thereby forming a blurry image.

For example, if the object is located at position (1) and scatters and reflects a beam from the lighting unit, and the beam enters the image sensor, the pattern formed by the A, E, I, and J regions have a clear image, and the patterns formed by the other regions have a blurry image.

An in-focus zone may become −∞~+delta zone or −delta~+∞ zone with respect to the reference focal plane according to the design of the DOE. In this case, if the object is in a specific focal position, a pattern having a reference focal plane ahead of (behind) the reference position of the object forms a clear image on the image sensor, while a pattern having a reference focal plane behind (ahead of) the reference position of the object forms a blurry image on the image sensor. According to the order of the reference focal planes, it is possible to determine at which focal depth position the object currently exists.

If the object is midway between two focal planes, patterns corresponding to the two focal planes may come into focus simultaneously and form a clear image on the image sensor. At this point, the intermediate point of the two focal planes may be calculated to be a depth position at which the object exists.

According to the number or range of depth positions of a target object, the number of segmented regions of the DOE or the number of groups of the DOE may vary, and the grid pattern of each region or the grid pattern of the regions of the same group may vary. The number of segmented regions of the DOE or the number of groups of the DOE may be equal to the number of depth positions of the object, i.e., the number of focal positions.

To distinguish between patterns reflected or scattered at different depth positions based on an image obtained from the image sensor, the patterns at the respective focal positions should have different characteristics, such as a size, a shape, a direction, a strength, a density, a modulation method (or period), a polarization, etc. on the image sensor. Also, it is necessary for the image processor and the depth detector to sort out the differences in the characteristics from the image obtained from the image sensor and obtain the depth of the object.

FIG. 5 shows many examples for distinguishing between patterns having different focal positions from each other. In FIG. 5, the patterns are different in their characteristics according to three focal positions (Depth 1, Depth 2, and Depth 3), for instance.

The size of a pattern imaged on the image sensor may vary according to each focal position. If the object is located at Depth 1, which is the closest position, a pattern having a focal position at Depth 1, for example, the pattern formed by the A, E, I, and J regions among the segmented regions of the DOE of FIG. 3, is reflected from the object and forms a round dot of the smallest size on the image sensor, while patterns having a focal position at Depth 2 and Depth 3 are reflected from the object and form a blurry round dot on the image sensor.

If the object is located at Depth 2, which is the intermediate position, a pattern having a focal position at Depth 1, for example, the pattern formed by the B, F, G, and K regions among the segmented regions of the DOE of FIG. 3, is reflected from the object and forms a clear dot of the intermediate size on the image sensor, while patterns having a focal position at Depth 1 and Depth 3 are reflected from the object and form a blurry round dot on the image sensor.

Likewise, if the object is located at Depth 3, which is the farthest position, a pattern having a focal position at Depth 3, for example, the pattern formed by the C, D, H, and L regions among the segmented regions of the DOE of FIG. 3, is reflected from the object and forms a dot of the largest size on the image sensor, while patterns having a focal position at Depth 1 and Depth 2 are reflected from the object and form a blurry round dot on the image sensor. The blurry round dot formed on the image sensor may have a very large size because they are out of focus.

Therefore, the image processor processing an image obtained from the image sensor can calculate the depth or distance of the object based on the size of a dot included in the image.

Moreover, the shape of a pattern imaged on the image sensor may vary according to each focal position. A pattern having a focal position at Depth 1, for example, the pattern formed by the A, E, I, and J regions among the segmented regions of the DOE of FIG. 3, may be reflected from the object located at Depth 1 and form a clear round dot on the image sensor, a pattern having a focal position at Depth 2, for example, the pattern formed by the B, F, G, and K regions among the segmented regions of the DOE of FIG. 3, may be reflected from the object located at Depth 2 and form a clear, horizontally long bar shape on the image sensor, and a pattern having a focal position at Depth 3, for example, the pattern formed by the C, D, H, and L regions among the segmented regions of the DOE of FIG. 3 may be reflected from the object located at Depth 3 and form a clear cross shape on the image sensor.

The round dot, the bar shape, and the cross shape are merely examples, and a desired shape can be obtained by adjusting the depth, width, and duty ratio of a diffraction grid of a corresponding region of the DOE and the arrangement of the diffraction grid. As above, if the object is out of its focal position, a pattern for the focal position forms a blurry image on the image sensor, and the size of the pattern becomes larger.

Moreover, the direction of a pattern imaged on the image sensor may vary according to each focal position. A pattern having a focal position at Depth 1 may be reflected from the object located at Depth 1 to form a clear, horizontally long bar shape on the image sensor, a pattern having a focal position at Depth 2 may be reflected from the object located at Depth 2 to form a clear bar shape on the image at a slope of 45 degrees, and a pattern having a focal position at Depth 3 may be reflected from the object located at Depth 3 to form a clear, vertically long bar shape on the image sensor.

Further, the shape of a pattern imaged on the image sensor may be identical, and the strength thereof may vary according to each focal position. The pattern having a focal position at Depth 1 may be reflected from the objet located at Depth 1 to form a round dot of a predetermined size (having a boundary separating it from the surroundings) with a low-level strength on the image sensor, the pattern having a focal position at Depth 2 may be reflected from the object located at Depth 2 to form a round dot of the same size with an intermediate-level strength on the image sensor, and the pattern having a focal position at Depth 3 may be reflected from the object located at Depth 3 to form a round dot of the same size with a high-level strength on the image sensor.

In addition, the density of a pattern imaged on the image sensor may vary according to each focal position. That is, three round dots, for example, may be included in a pattern imaged on the image sensor, and the intervals of the dots may vary according to focal position. A pattern having a focal position at Depth 1 may be reflected from the object located at Depth 1 to form a plurality of round dots on the image sensor at narrow intervals, a pattern having a focal position at Depth 2 may be reflected from the objected located at Depth 2 to form a plurality of round dots on the image sensor at intermediate intervals, and a pattern having a focal position at Depth 3 may be reflected from the object located at Depth 3 to form a plurality of round dots on the image sensor at wide intervals.

In addition, the period of a pattern imaged on the image sensor may vary according to each focal position. That is, a plurality of round dots and long bars, for example, may be repeated in a pattern imaged on the image sensor, and the number of round dots placed between the long bars may vary according to focal position. A pattern having a focal position at Depth 1 may be reflected from the object located at Depth 1 to form a plurality of long bars and round dots on the image sensor so that a single round dot is formed between the long bars, a pattern having a focal position at Depth 2 may be reflected from the object located at Depth 2 to form a plurality of long bars and round dots on the image sensor so that two round dots are formed between the long bars, and a pattern having a focal position at Depth 3 may be reflected from the object located at Depth 3 to form a plurality of long bars and round dots on the image sensor so that three round dots are formed between the long bars.

In addition, the polarization direction of a pattern imaged on the image sensor may vary according to each focal position. A pattern having a focal position at Depth 1 may be reflected from the object located at Depth 1 and imaged on the image sensor in a horizontal polarization direction, a pattern having a focal position at Depth 2 may be reflected from the object located at Depth 2 and imaged on the image sensor at a polarization angle of 45 degrees, and a pattern having a focal position at Depth 3 may be reflected from the object located at Depth 3 and imaged on the image sensor in a vertical polarization direction.

By varying polarization according to focal position by means of the DOE, it is possible to obtain the position of an object by disposing a polarization element for distinguishing between polarizations in front of the image sensor, rotating the polarization element, detecting the polarization of a beam entering the image sensor in synchronization with the rotating polarization element on a time axis, and distinguishing between patterns.

As seen from above, the distance or depth information of an object can be detected more accurately by combing two or more methods using different patterns with different characteristics according to each focal position, for example a method of varying both the size and shape of a pattern according to its focal position.

Instead of using a single light source and forming a plurality of regions in a single DOE, the plurality of regions having different focal distances and different characteristics like size, shape, direction, strength, density, period, polarization, etc., the lighting unit may use a plurality of light sources and a plurality of DOEs.

Figure 6:
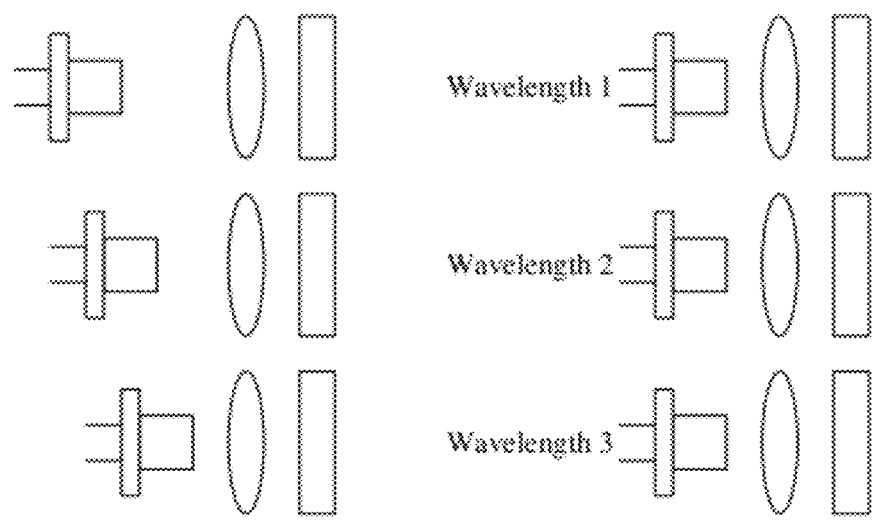
FIG. 6 shows an embodiment in which a lighting unit uses a plurality of light source and DOE pairs to vary focal position.

FIG. 6 shows an embodiment in which a lighting unit uses a plurality of light source and DOE pairs to vary focal position. Each of the plurality of DOEs may have a diffraction grid so that patterns formed on the image sensor are different in their characteristics, for example, size, shape, direction, strength, etc as shown in FIG. 5. Also, to adjust the focal positions of patterns created from the light source and DOE pairs to be different from each other, as shown in FIG. 6, the positions of a light source and a collimate lens for each pair can be varied, or the wavelength of a light source for each pair can be varied.

Figure 7:
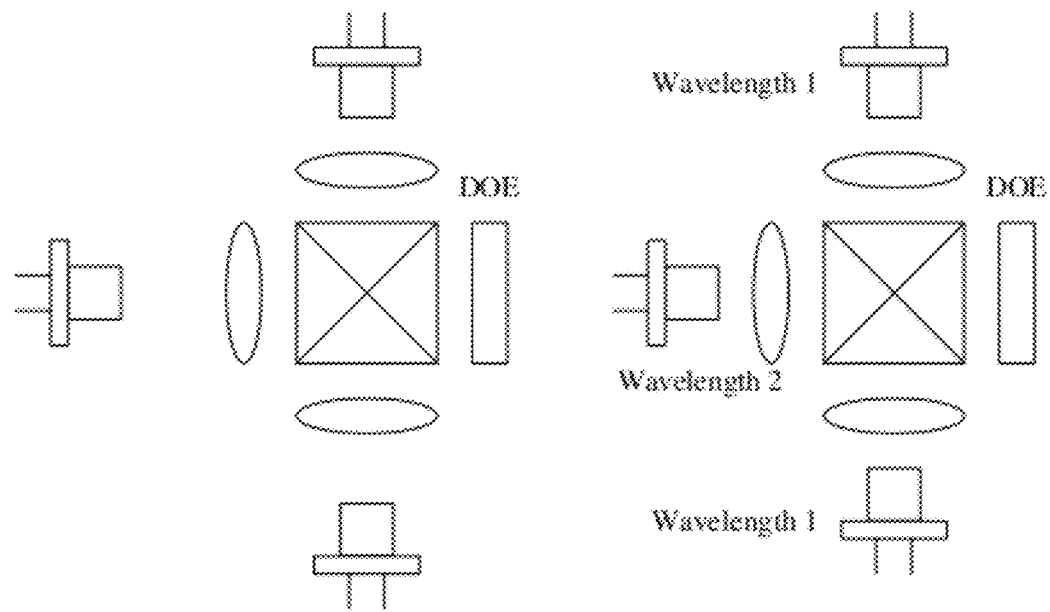
FIG. 7 shows an embodiment of a lighting unit that uses a single DOE having segmented regions and a plurality of light sources to distinguish between focal positions.

FIG. 7 shows an embodiment for a lighting unit that uses a single DOE having segmented regions and a plurality of light sources to distinguish between focal positions. In FIG. 7, a prism for changing the path of light to cause beams coming from the plurality of light sources to be directed toward an object is used so that the beams coming from the plurality of light sources pass through the single DOE. Each of the light sources may vary in their convergence property of a beam entering the DOE by adjusting the distance to the collimate lens and varying the wavelength of the light source.

By means of such combinations, the above-described different patterns may have an in-focus region at different depth positions.

In another embodiment of the present invention, a 3D camera system will be described which has the above-described apparatus for detecting distance information or depth information of an object added to a second-dimensional (2D) image capturing device to obtain three-dimensional (3D) image content.

As described above, the depth information detection apparatus may comprise a lighting unit for outputting a lighting pattern, a beam receiving unit for detecting a beam reflected/scattered from an object, and a depth calculator. The lighting unit may consist of a light source, a collimate lens, and an optical element (e.g., diffractive optical element) for scattering desired patterns.

The optical element of the lighting unit allows lighting patterns to be coded (allows sub-grid regions to be arranged) by a signal processing technique so that a pattern pit area (more precisely, a single sub-grid region constituting a pattern) or an array of sub-grid regions has coordinate information for a two-dimensional space. The pattern pit area (or sub-grid region) represents an area in which a grid for optically modulating (such as diffraction) a beam coming from a light source is formed. The pattern pit area is a basic unit for modulating a beam incident from a light source in predetermined properties (e.g., intensity, direction, etc.).

Coordinate information may be represented by Cartesian coordinates (X, Y), or by a view angle from a sensor. It is necessary for coordinate information of each sub-grid region to be distinguished from each other later on an image captured by the sensor. Thus, each sub-grid region needs to be arranged such that at least adjacent sub-grid regions do not overlap with each other (such that planar arrays (or combinations) of sub-grid regions, each array consisting of a plurality of sub-grid regions, are different from each other at different positions), and a technique such as balanced code or pseudo balanced code may be applied to the arrangement of pits (or sub-grids) within the optical element in such a manner that sub-grid regions of the same type are not one-sided but various types of sub-grid regions are uniformly distributed.

Hereupon, a modulation method applied to sub-grid regions, i.e., a method for distinguishing a sub-grid region from the other sub-grid regions is, as shown in FIG. 5, to distinguish the values or levels of characteristics (e.g., values or levels of intensity, size, shape, direction, strength, density, period, and polarization) of a beam having passed through at least one sub-grid region from the values or levels of the characteristics of beams having passed through the other sub-grid regions.

Figure 8:
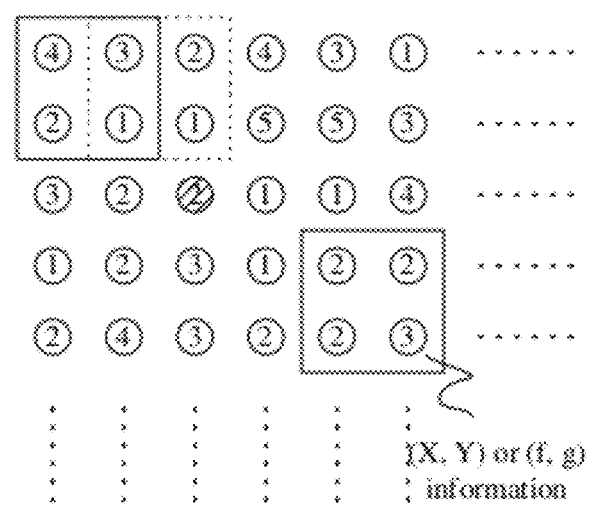
FIG. 8 shows an embodiment of a lighting pattern array that provides coordinate information.

FIG. 8 shows an embodiment of a lighting pattern that provides coordinate information. The following description will be made with respect to the case where each dot (sub-grid region) has different values of optical intensity.

In FIG. 8, a number indicates the intensity of a beam having passed through a corresponding sub-grid region (which can be regarded as a sub-grid region for outputting the beam intensity of the number) of an optical element. As a light source for lighting has excellent spatial characteristics, a beam having passed through the optical element proceeds while maintaining the pattern (planar array or combination of optical intensity values) as shown in FIG. 8. When the beam is reflected from an object at the same distance and same plane as the light from the lighting, it can enter the sensor as well in the pattern of FIG. 8.

As the intensity distribution of a beam imaged on the sensor is determined by a pattern (array of sub-grid regions) of the optical element, coordinate information can be obtained from the intensity distribution of the beam detected by the sensor. That is, in FIG. 8, coordinate information (relative position in the optical element) can be obtained for the slashed position of intensity 2 having (3, 2, 2, 1, 1) in a horizontal direction and (2, 1, 2, 3, 3) in a vertical direction. Instead of obtaining coordinate information about each of the dots (basic unit area having the same optical intensity), the sum (the value of multiplication or a predetermined operation) of light intensities of four dots (a group of dots), for example, can be obtained and used to obtain coordinates for the corresponding group of dots. The sum of light intensities of a group of four dots included in a square box in FIG. 8 is in the order of 10 (4, 3, 2, 1)→7 (3, 2, 1, 1)→12 (2, 4, 1, 5) in a horizontal direction from the top left and in the order of 10 (4, 3, 2, 1)→8 (2, 1, 3, 2)→8 (3, 2, 1, 2) in a vertical direction from the top left. Based on this, coordinate information of each dot can be obtained.

If the optical element has 1,000 pit areas in horizontal and vertical directions, respectively, 1 million coordinates can be represented. From this, depth information about 1 million pixels can be obtained.

Although the foregoing description has been made of the case where each dot (sub-grid region) has a different value of light intensity, this description also may be applied to variations of values or levels of the size, shape, direction, strength, density, period, polarization, etc. of light.

Figure 9:
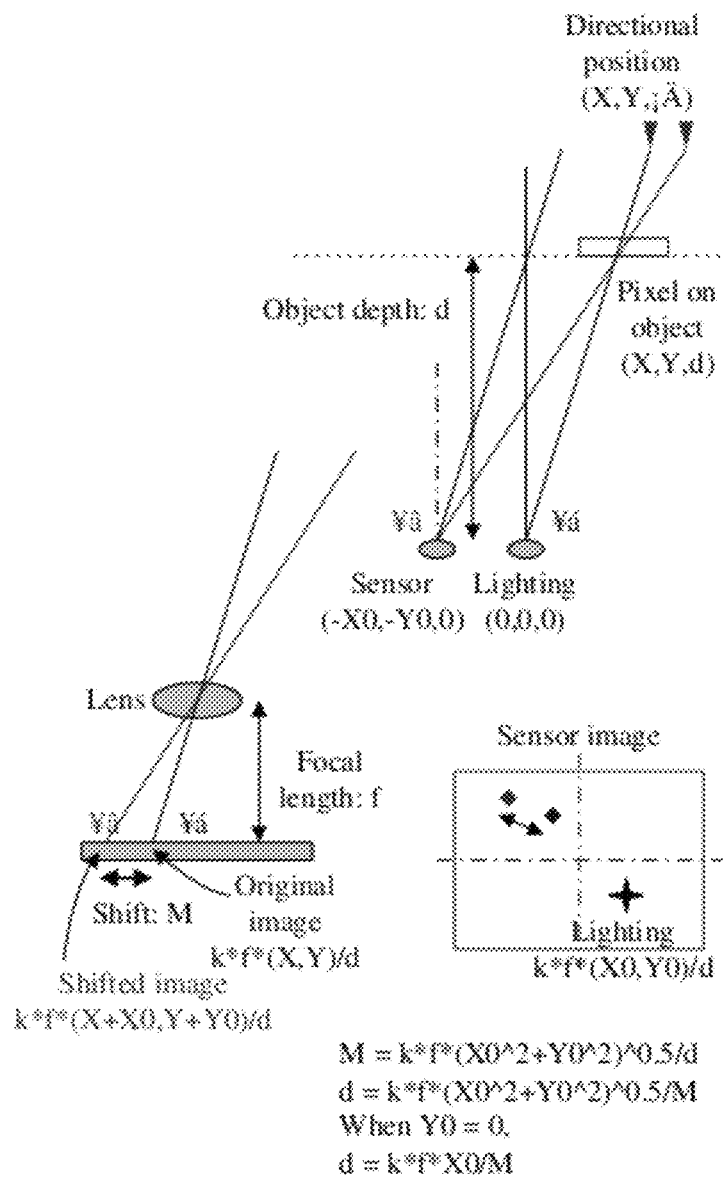
FIG. 9 is a view for explaining the principle of obtaining distance information of an object.

A method for obtaining depth information of each position by outputting lighting patterns having coordinate information and detecting reflected light by a sensor is illustrated in FIG. 9.

If there is a difference between the position of a lighting system for outputting lighting patterns having coordinate information and the position of the beam lighting unit, a beam reflected at an infinite distance causes the angle from the lighting system and the angle from the beam receiving unit to coincide in parallel; whereas a beam reflected from a specific depth causes the angle from the lighting system and the angle from the beam receiving unit to be different from each other.

In the sensor of the beam receiving unit, a pattern of a beam reflected from a specific position (distance or depth) appears as a shift on the coordinates relative to a pattern of a beam reflected from an infinite position (relatively far position). At this point, the correlation among the distance between the lighting system and the beam receiving unit, the depth to be calculated, and the shift of distance on the coordinates is expressed as in the equation shown in FIG. 9. That is, the depth to be calculated is expressed in proportion to the reciprocal of the shift of distance on the coordinates. Using this method, the original coordinates (on which a beam is imaged when reflected from infinity) of dots (created by sub-grid regions and having a predetermined light intensity) detected by the beam receiving unit and the shifted coordinates (on which a beam is reflected at a predetermined depth) can be found. Also, depth information can be obtained for each basic unit (each dot) of modulation by using the difference between the original coordinates and the shifted coordinates. The original coordinates can be found based on the distance and position relationship between the sensor and the lighting unit.

Figure 10:
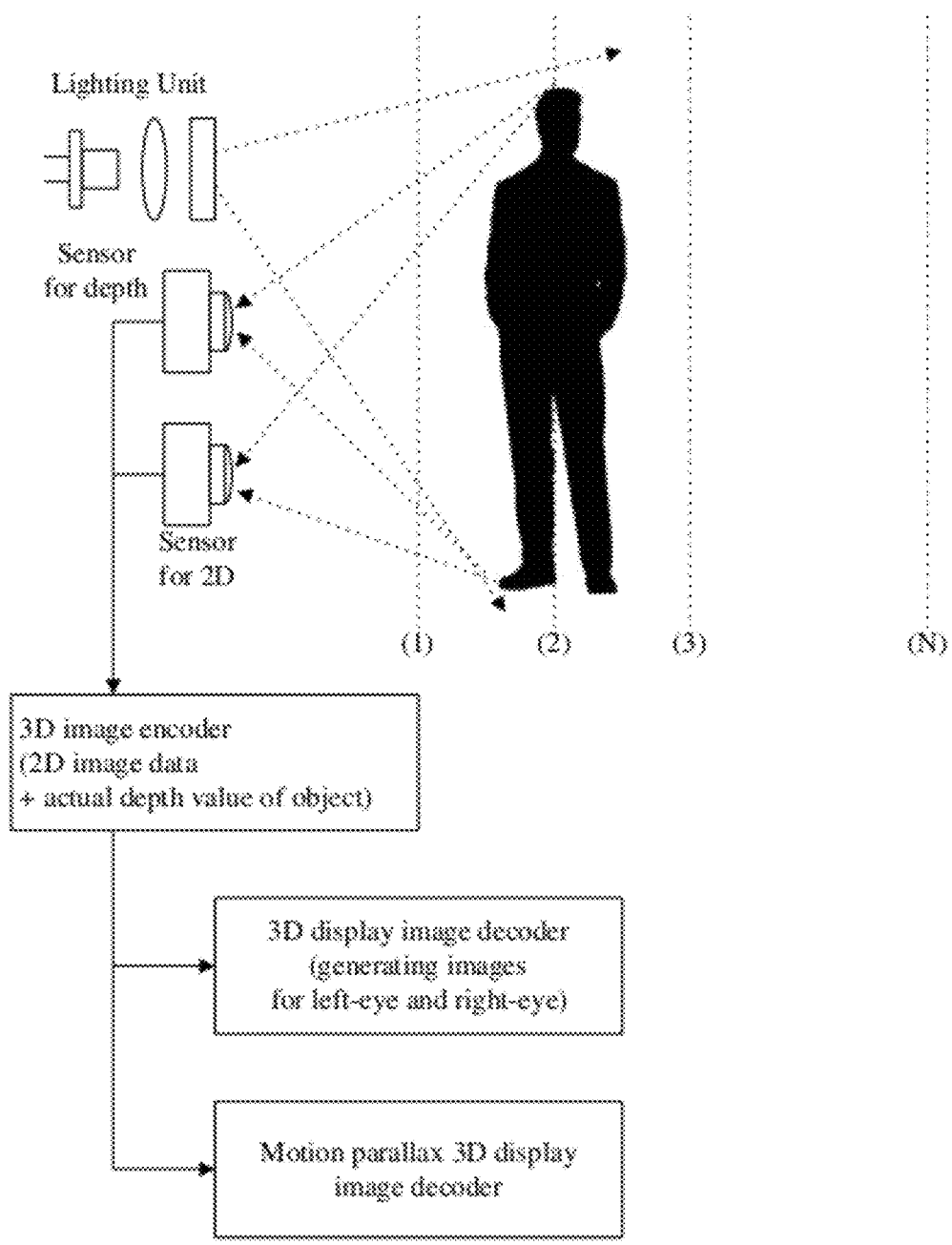
FIG. 10 schematically illustrates a system for generating and displaying 3D content by combining a depth information detector and a 2D image detection system.

As shown in FIG. 10, a 3D image capturing system according to an embodiment of the present invention comprising the depth information detection apparatus using the above-described technology may comprise a camera for capturing a 2D image and a depth information detection apparatus. The system of FIG. 10 can create and transmit a 3D image by using images and depth information obtained by each sensor.

Depth information from each pixel may be managed as a continuous value to create a 3D image, or a depth may be segmented into N segments (depth planes) according to its value and pixels corresponding to each segment (depth plane) are collected to constitute a pixel set for the corresponding depth and create 3D content. The difference between the created 3D content and that created by a conventional 2-camera method is that depth information of each object or pixel is not information indirectly calculated from two sheets of 2D image but directly detected information.

The thus-obtained 3D content may be easily processed into data for a 3D display device using a motion parallax technique, as well as a conventionally used 3D display device that provides two images of left and right eyes. Particularly, pixel sets for N discontinuous depth planes, if created and used, can be applied directly to a motion parallax 3D display method.

Figure 11:
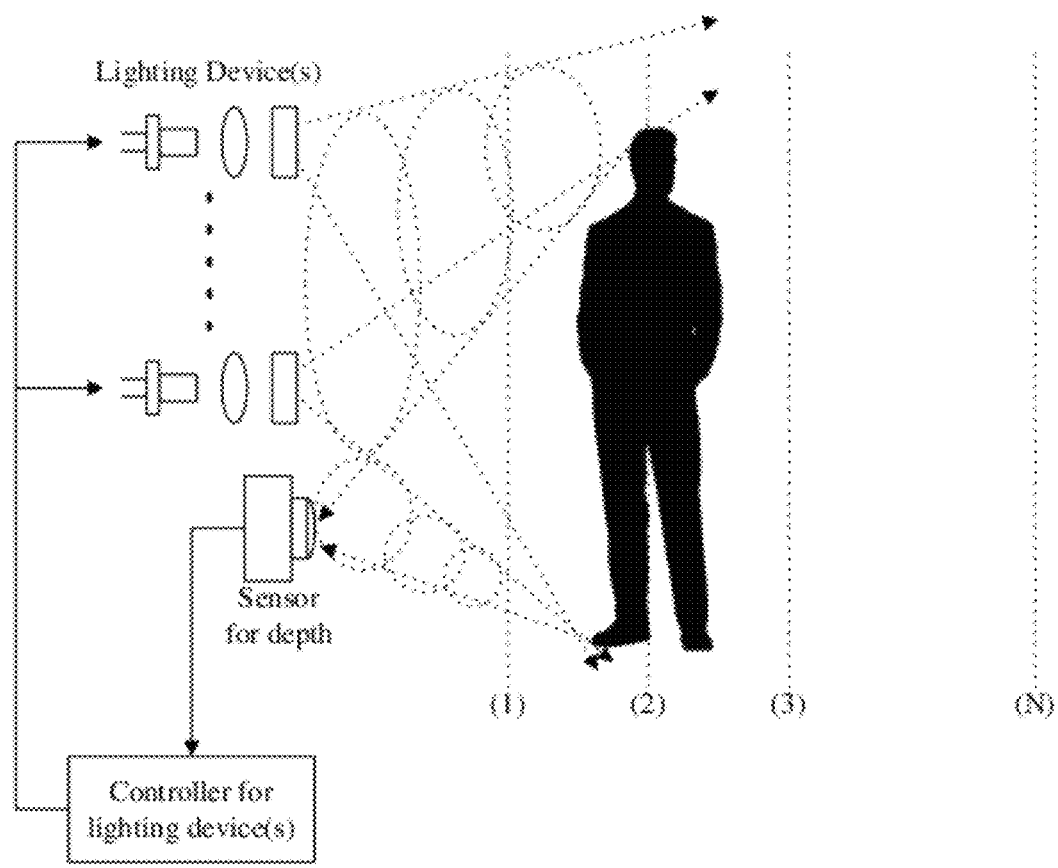
FIG. 11 illustrates an embodiment of a lighting device for obtaining depth information.

FIG. 11 illustrates an embodiment of a lighting device for obtaining depth information, which is illustrated to explain the physical connection between the lighting device and the sensor.

In detecting depth information, depth-direction resolution becomes lower as it gets distant from the sensor, and is associated with the distance between the sensor and the lighting device. Although an increase in the distance between the sensor and the lighting may improve depth resolution even at a distant position, this has the drawback that blind areas (elliptical areas of FIG. 11) between the divergence angle of the lighting and the sensor view angle become larger and a depth detection system should be larger.

Accordingly, the following two methods can be considered in order to distinguish between an object at a short distance and an object at a long distance at a depth resolution of an appropriate level by a single system.

One of them is to arrange two or more N lightings different in the distance from the sensor, and the other one is to install a mechanically movable lighting and adjust the distance from the sensor according to situations. A lighting controller for controlling the N lightings or the movable lighting may be needed. The lighting controller is able to run a processing that firstly detects the initial depth of an object, and determines the distance between the optimum lighting and the sensor, and moves the movable lighting or selects the lighting at the optimum position to operate it.

If N lightings are used, they may have the same type of lighting pattern. In this case, only the lighting at the optimum distance can be switched on. Alternatively, each lighting may have a different type of lighting pattern from the others. In this case, two or more lightings can be switched on and used for depth measurement.

Figure 12:
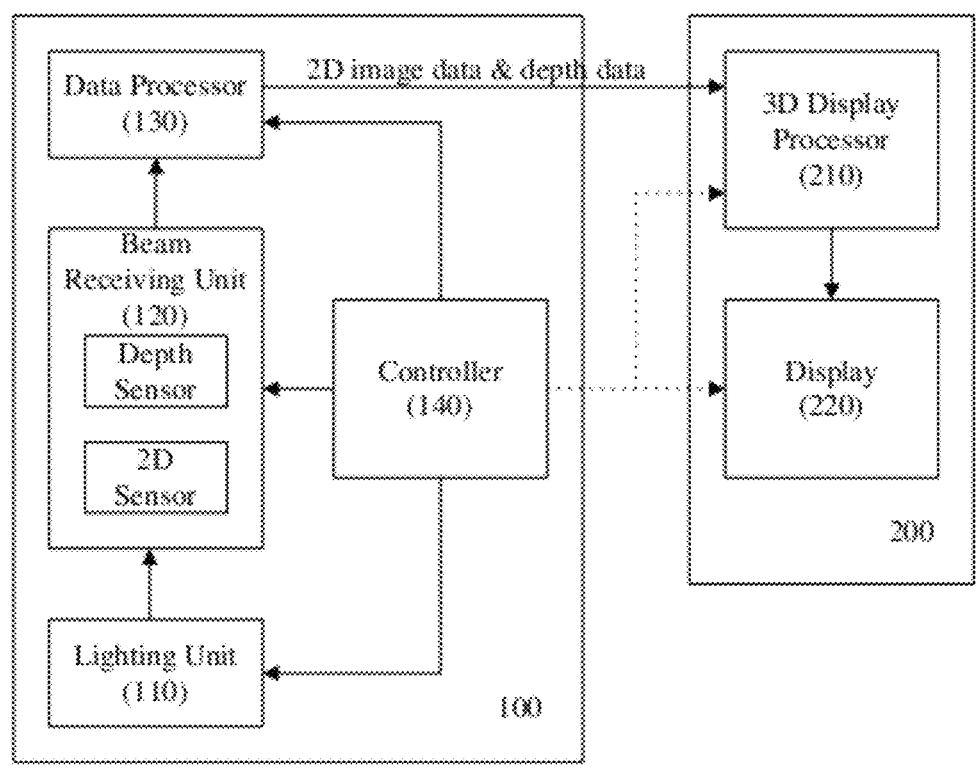
FIG. 12 illustrates the overall configuration of a system for generating 3D content and displaying it according to an embodiment of the present invention.

FIG. 12 illustrates the overall configuration of a system for generating 3D content and displaying it according to an embodiment of the present invention.

The overall system according to the present invention of FIG. 12 may comprise an image information obtaining device 100 for acquiring 3D content information and a display device 200 for displaying obtained 3D content information. The image information obtaining device 100 and the display device 200 may exist as independently separate individual products, or may be configured together within a single product.

In the case that the image information obtaining apparatus 100 and the display device 200 are configured together as a single product, some functional blocks may be integrated. For instance, a controller 140 in the image information obtaining device 100 may control a 3D display processor 210 and a display 220 in the display device 200. Moreover, a data processor 130 in the image information obtaining apparatus 100 and a 3D display processor 210 in the display device 200 may be configured as a single block.

A lighting unit 110 and a beam receiving unit 120 in the image information obtaining apparatus 100 may be configured in the method explained with reference to FIGS. 10 and 11. The beam receiving unit 120 comprises both a depth sensor for obtaining depth information and a sensor for obtaining 2D image information. Of course, the beam receiving unit may further comprise a lens module for focusing a beam on the 2D image sensor and/or the depth sensor. A filter for selecting polarization or wavelength may be further attached to a lens for the depth sensor. The 2D image sensor, the lens, etc. may be collectively referred to as a 2D image capturing unit.

The data processor 130 calculates depth information of each coordinate based on images from the depth sensor, and processes the 2D image information obtained from the beam receiving unit 120 and the calculated depth information, encodes them according to a predetermined format, and outputs or stores them.

The controller 140 controls the configurations of all the blocks. Particularly, as shown in FIG. 11, the controller 140 is able to perform the lighting control functions, such as setting a physical interval between the lighting unit 110 and the depth sensor and setting a lighting pattern.

The 3D display processor 210 uses 2D image data and a depth value, which are generated by the data processor 130, to generate 3D content according to the characteristics of the display 220.

For example, the 3D display processor 210 may generate images for left and right eyes, separately, in order to represent a 3D image, or may use a depth value to generate a depth plane. That is, it is possible to generate more accurate 3D content and display it by using a precise depth value generated by the data processor 130.

Although the exemplary embodiments of the present invention described above have been disclosed for illustrative purposes, various modifications, variations, substitutions or additions thereto are possible, without departing from the scope and spirit of the invention disclosed in the accompanying claims.

What is claimed is:

1. An apparatus for recognizing the distance of an object, the apparatus comprising:
    a lighting unit comprising one or more light sources and one or more optical elements, and for outputting a beam having at least two different focal positions;
    a beam receiving unit comprising an image sensor, and for receiving a returning beam reflected or scattered from the object; and
    an image processor for detecting the distance to the object from an image obtained by the beam receiving unit upon receiving the beam output by the lighting unit and reflected or scattered from the object,
    wherein the one or more optical elements form two or more segmented regions, at least one of the segmented regions having a focal position different from those of other segmented regions, and a pattern formed by the at least one segmented region has characteristics different from those of one or more patterns formed by other segmented regions,
    wherein the depth calculator determines a sub-grid region in the one or more optical elements corresponding to a region in the image based on the distribution of the characteristics, and obtains depth information of the region by using the difference between the original coordinates of the region in which a beam having passed through the determined sub-grid region is reflected from a relatively distant position and imaged on the sensor and the coordinates of the region corresponding to the determined sub-grid region.

2. The apparatus of claim 1, wherein the output beam of the one or more light sources is a laser having a wavelength longer than that of visible light, the lighting unit further comprises a lens for adjusting the degree of convergence/divergence of the output beam of the light source, and the beam receiving unit further comprises a filter for selecting the wavelength of the output beam of the light source and a lens for focusing the beam on the image sensor.

3. The apparatus of claim 1, wherein, when one or more segmented regions are defined as a group, at least one group has a different focal position from those of other groups, and a pattern formed by the at least one group has different characteristics from those of patterns formed by other groups.

4. The apparatus of claim 1, wherein the number of segmented regions included in the one or more optical elements is equal to the number of focal positions, and the lighting unit comprises a single light source and a single optical element, or comprises a single optical element and the same number of light sources as focal positions.

5. The apparatus of claim 1, wherein the characteristics are one or two combinations of a size, a shape, a direction, a strength, a density, a period, and a polarization of a pattern.

6. A depth information detection apparatus, the apparatus comprising:
    a lighting unit comprising one or more light sources and one or more optical elements having a plurality of sub-grid regions for modulating beams coming from the light sources, and for outputting a lighting pattern having coordinate information;
    a beam receiving unit comprising a sensor, and for receiving returning beams output from the lighting unit and reflected from an object, wherein a beam having passed through at least one sub-grid region shows a different value or level of characteristics from those of beams having passed through the other sub-grid regions; and
    a depth calculator for calculating the depth for each coordinate by using a distribution of predetermined characteristics represented on an image obtained by the sensor;
    wherein planar arrays of sub-grid regions, each planar array consisting of a plurality of sub-grid regions, are arranged in the one or more optical elements such that at least adjacent arrays of sub-grid regions do not overlap with each other and sub-grid regions showing different values or levels of the predetermined characteristics are uniformly distributed.

7. The apparatus of claim 6, wherein the characteristics are one or two or more combinations of a size, a shape, a direction, a strength, a density, a period, and a polarization of a pattern.

8. The apparatus of claim 6, wherein the depth calculator determines a sub-grid region in the one or more optical elements corresponding to a region in the image based on the distribution of the characteristics, and obtains depth information of the region by using the difference between the original coordinates of the region in which a beam having passed through the determined sub-grid region is reflected from a relatively distant position and imaged on the sensor and the coordinates of the region corresponding to the determined sub-grid region.

9. The apparatus of claim 6, wherein the apparatus comprises two or more N lighting units placed at different distances from the beam receiving unit, or the lighting unit is mechanically movable.

10. The apparatus of claim 9, further comprising a lighting controller for selecting one or more of the N lighting units and operating the same, or adjusting the distance between the movable lighting unit and the beam receiving unit.

11. The apparatus of claim 10, wherein, if the N lighting units output the same type of lighting pattern, the lighting controller selects one lighting unit and operates the same, or if at least one of the N lighting units outputs a different type of lighting pattern, the lighting controller selects two or more lighting units and operates the same.

12. An apparatus for obtaining 3D content, the apparatus comprising:
    a lighting unit for outputting a lighting pattern having coordinate information;
    a depth sensor for receiving a returning beam output from the lighting unit and reflected from an object;
    a 2D image capturing unit for obtaining a second-dimensional image;
    a data processor for calculating a depth of each region using a distribution represented on an image obtained by the depth sensor, and processing 2D image data obtained by the 2D image capturing unit and the calculated depth data and encoding the same according to a predetermined format; and a controller for controlling the lighting unit, the 2D image capturing unit, and the data processor, wherein the lighting unit comprise one or more light sources and one or more optical elements forming a plurality of sub-grid regions for modulating beams coming from the one or more light sources, and a beam having passed through at least one sub-grid region shows a different value or level of characteristics from those of beams having passed through other sub-grid regions, wherein the data processor determines a sub-grid region in the one or more optical elements corresponding to a region in the image based on the distribution of the characteristics represented on an image obtained by the sensor, and obtains depth information of the region by using the difference between the original coordinates of the region in which a beam having passed through the determined sub-grid region is reflected from a relatively distant position and imaged on the sensor and the coordinates of the region corresponding to the determined sub-grid region.

13. The apparatus of claim 12, wherein the apparatus comprises two or more N lighting units placed at different distances from the beam receiving unit, or the lighting unit is mechanically movable, and the controller selects one or more of the N lighting units and operates the same, or adjusts the distance between the movable lighting unit and the beam receiving unit.

14. The apparatus of claim 13, wherein, if the N lighting units output the same type of lighting pattern, the lighting controller selects one lighting unit and operates the same, or if at least one of the N lighting units outputs different types of lighting pattern, the lighting controller selects two or more lighting units and operates the same.

15. The apparatus of claim 12, wherein the characteristics are one or two combinations of a size, a shape, a direction, a strength, a density, a period, and a polarization of a pattern.

* * * * *